Oct. 22, 1968

C. GALOPIN

3,407,361

AUTOMATIC FREQUENCY CONTROL SYSTEM WITH
INTERMITTENT PHASE RESETTING MEANS

Filed Nov. 29, 1966

CLAUDE GALOPIN,
Inventor
by Stephen K. Frishauf
Attorney

United States Patent Office 3,407,361
Patented Oct. 22, 1968

3,407,361
AUTOMATIC FREQUENCY CONTROL SYSTEM WITH INTERMITTENT PHASE RESETTING MEANS
Claude Galopin, Courbevoie, France, assignor to Compagnie Francaise Thomson-Hotchkiss Brandt, Paris, France, a corporation of France
Filed Nov. 29, 1966, Ser. No. 597,795
Claims priority, application France, Dec. 8, 1965, 41,357
13 Claims. (Cl. 331—10)

ABSTRACT OF THE DISCLOSURE

A phase-lock system synchronizes a first (or output) periodic signal with a second (input) periodic signal; an error signal indicative of a discrepancy between the phase conditions of the signals is produced and the frequency of the first signal is varied in accordance with such error signal and in a sense to reduce the discrepancy. Additionally, the phase condition of the first signal is altered independently of the means for varying the frequency thereof, and a phase-altering means is intermittently operated to reset the phase condition of the first signal into substantial agreement with the phase condition of the second signal.

---

The purpose of this provision is to eliminate any tendency of the system to hunt without ever achieving synchronism, such tendency being due to the periodic reversals in the sign of the phase error caused by the beat frequency condition present between the two nonsynchronous signals, which hunting tendency has heretofore severely limited the performance of such systems.

The invention in another aspect provides a signal synchronizing system of the said phase-lock class, wherein the phase error signal has a large relative magnitude so long as the two signals are substantially unsynchronous, and is switched to a considerably smaller relative magnitude after approximate synchronism has been attained between the two signal frequencies. This provision hastens the attainment of the fully synchronous condition without impairing the ultimate precision and stability of the phase follow-up operation.

Background

Signal synchronizing systems of the class often designated as phase-lock are widely used in present day communications. The broad function of such systems is to generate a first periodic signal which is precisely synchronized in frequency and phase with a second, separately generated periodic signal. As one illustrative field of application of these systems, satellite communications may be mentioned. A satellite-tracking ground station may transmit pulsed interrogation signals at a prescribed rate or frequency. A satellite being tracked may be provided with responder equipment which is triggered by reception of the interrogation signals to transmit signals of exactly the same frequency, which may be modulated to convey telemetering information or the like.

Another important field of use of phase-lock systems relates to frequency synthesizers, which serve to generate a great number of output frequencies (e.g., several hundreds or thousands) at precisely controlled values differing by small incremental amounts, all these frequencies being derived from a common base or pilot frequency produced by a high-stability, high-precision crystal-controlled master oscillator.

In any system of this general class, the first or output signal is compared in angle (i.e., frequency and/or phase) with the second or input signal. The result of the comparison provides an error signal which serves to vary the angle of the first signal. Usually, the two signals are compared in phase, the resulting phase error signal is integrated and the integrated error signal is applied to the frequency-varying input of a voltage-controlled oscillator which determines the frequency of the first, output, signal.

While the operating principle thus described is simple in theory, serious difficulties arise when it is desired to construct such a system having maximum efficiency and optimum performance characteristics.

As long as the frequency of the first signal differs rather considerably from that of the second signal, as is the case during initial operation of the system, in the so-called acquisition mode or stage, the system must operate to vary the frequency of the first signal into agreement with that of the second signal. When this has been done, in the subsequent phase follow-up mode of operation, the system must maintain the phase of the first signal in accurate and constant agreement with the phase of the second signal. It should be realized in this connection that while the frequency and phase of a periodic signal are obviously interrelated in that the phase is the time integral of frequency, the conditions for optimal efficiency are very different, and indeed to a large extent conflicting, in the acquisition mode and in the phase follow-up mode. It is convenient to visualize the system as operating to achieve frequency agreement during the initial acquisition stage, and as operating to maintain phase agreement during the subsequent, more durable, phase-followup or tracking stage.

In respect to the acquisition stage, the main considerations affecting system performance are, first, that the system should be capable of accepting two signals initially differing in frequency by as great as possible an amount, and still bring them reliably to synchronism, and, secondly, that such frequency synchronization should be completed as rapidly as possible. In the phase-follow-up stage, on the other hand, the chief desideratum is sensitivity of control, assuring maintenance of the correct phase condition with high accuracy or stability, even in the presence of substantial noise disturbing the phase and other characteristics of the input signal.

As will be shown in detail later, high performance during the acquisition stage would require increasing the gain of the phase feedback loop, i.e., the incremental value of the phase error signal, whereas high performance during the phase followup stage requires reducing said gain or phase error increment. Conflict is therefore present. Moreover, even when the feedback gain or phase error increment is substantially increased, the maximum initial frequency mismatch which the system is able to accept is still quite small, say of the order of about 2% relative to the input frequency, whereas it would in many practical cases be desirable to acquire frequency synchronism when starting with an initial relative discrepancy of 10% or more.

The prior art has attempted to overcome some of these difficulties through the provision, in a phaseclock system, of two separate feedback loops, one for frequency acquisition and the other for phase follow-up. The resulting circuits have been complicated and, moreover, have not succeeded in enabling the system to accept initial frequency discrepancies as wide as would be desirable.

Description of the invention

Objects of this invention include the provision of signal synchronizing or phase-lock systems having considerably improved performance over conventional such systems, while being simple and dependable, and more specifically the provision of such systems having one or more of the following advantages:

The capability of reliably handling signals having initial frequency mismatches much greater than those acceptable heretofore, say of about 10% or more, e.g., of the order of one octave;

Optimal performance characteristics both in the acquisition mode, for rapidly and reliably attaining approximate agreement between the signal frequencies, and in the phase follow-up mode for continually maintaining accurate phase stability of the output signal to within an accuracy of the order of $\pm 10^{-7}$, even in cases where the input signal is disturbed by substantial noise producing phase "jitter" and other disturbances;

The provision of an improved phase comparator embodying a dual-acting integrator network.

Other objects will appear.

The invention is based principally on the recognition that one of the main factors that have heretofore limited the maximum acceptable frequency mismatch in a synchronizing system of the type disclosed, has been due to the beat-frequency effect arising out of the two different signal frequencies present in the system. As is well-known, the simultaneous presence of two mismatched frequencies within a common system may give rise to a third, comparatively low frequency equal to the difference between the mismatched frequencies. In a signal-synchronizing system of the type to which the invention relates, the phase angle between the output and input signals reverses periodically in sign at a rate corresponding to the beat frequency of the two signals. Since the beat cycle period is short in proportion as the frequency mismatch of the two signals is great, sign reversals in the error signal occur at a correspondingly rapid rate. Unless the system is able to complete its frequency-acquisition stage before a reversal in the error signal sign has occurred, that is, within one half of one cycle period of the beat frequency, it will be unable to achieve frequency synchronism but the output signal frequency will hunt indefinitely around an erroneous frequency value. The likelihood of occurrence of such objectionable hunting, and consequent failure to attain synchronism, increases in proportion as the initial frequency mismatch is large. This fact has constituted the main limitation on the acceptable initial frequency discrepancy that systems of this type have been able to handle.

According to the invention, this limitation is completely overcome through the provision of means for resetting the phase of the output signal at periodic intervals, the intervals being shorter than one half the beat cycle period corresponding to the largest initial frequency discrepancy that can be expected to occur between the signals handled by the system. Through this provision, reliable frequency synchronization is ensured in all cases.

According to a further feature of the invention, error signal increments of a first, relatively large, value are used during an initial stage of operation when the frequency disagreement exceeds a given amount, and error signal increments of a second and substantially smaller value are applied when the frequency disagreement has been reduced below that amount. In this way, the time required for completion of the acquisition stage is reduced, while still ensuring high accuracy and stability during the phase follow-up stage.

Exemplary embodiments of the invention will now be described with reference to the accompanying drawings, wherein.

Figure 2:
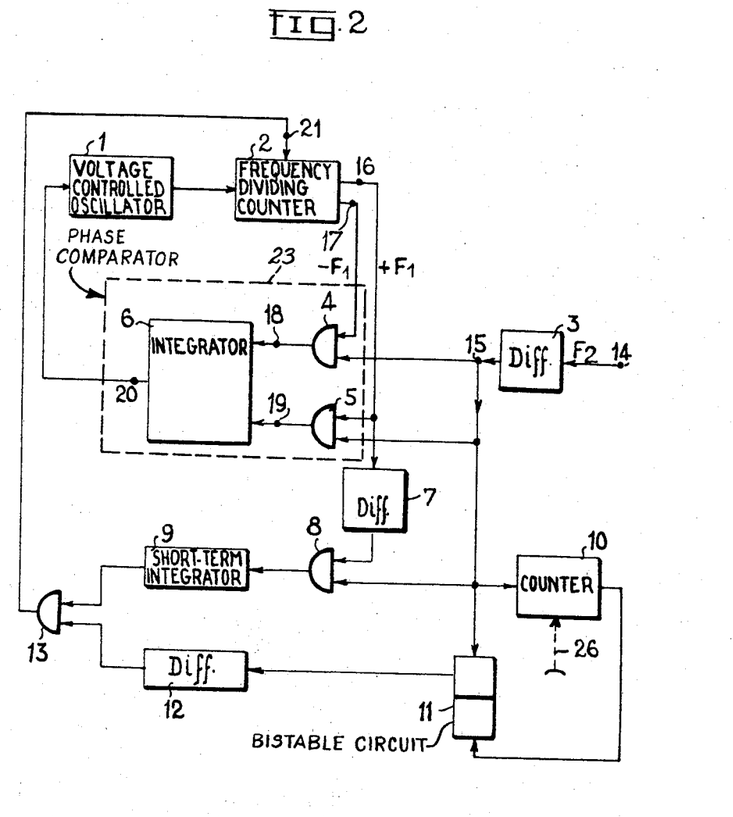
FIG. 2 is a block diagram of one embodiment of the invention.

In the system shown in FIG. 2, an input terminal 14 has periodic signals applied to it from any suitable source. The source of input signals may be a remotely located transmitter from which the signals are received over a radio or other link, or the source may be a locally situated master oscillator. The input signals may be sinusoidal, rectangular or of other shapes, it being here assumed that they are rectangular. The input signal frequency is designated $F_2$.

The system further includes an output signal generating assembly including a voltage-controlled oscillator 1 followed by a frequency-dividing counter 2. Oscillator 1 may be of any suitable and conventional type producing a sine-wave or other waveform whose frequency can be tuned over a prescribed range about a nominal value $f$ in response to a tuning voltage applied to the frequency-control input 20 of the oscillator. The oscillator output is applied to the input of the conventional binary counter 2 having two complementary outputs 16 and 17. When the counter 2 receives input pulses at the output frequency $f$ of the oscillator 1, counter output 16 delivers rectangular pulses at a rate $F_1$ that equals the oscillator frequency $f$ divided by the counting capacitor of counter 2, and output 17 concurrently delivers rectangular pulses at the same rate as output 16 but of reverse phase or polarity, as shown at the upper two lines (labelled 16 and 17) of FIG. 3A or FIG. 3B. The output wave forms appearing at terminals 16 and 17 are designated as the frequencies $+F_1$ and $-F_1$ respectively, and the $+F_1$ signal in this example constitutes the "first" or output signal of the system.

Figure 3A:
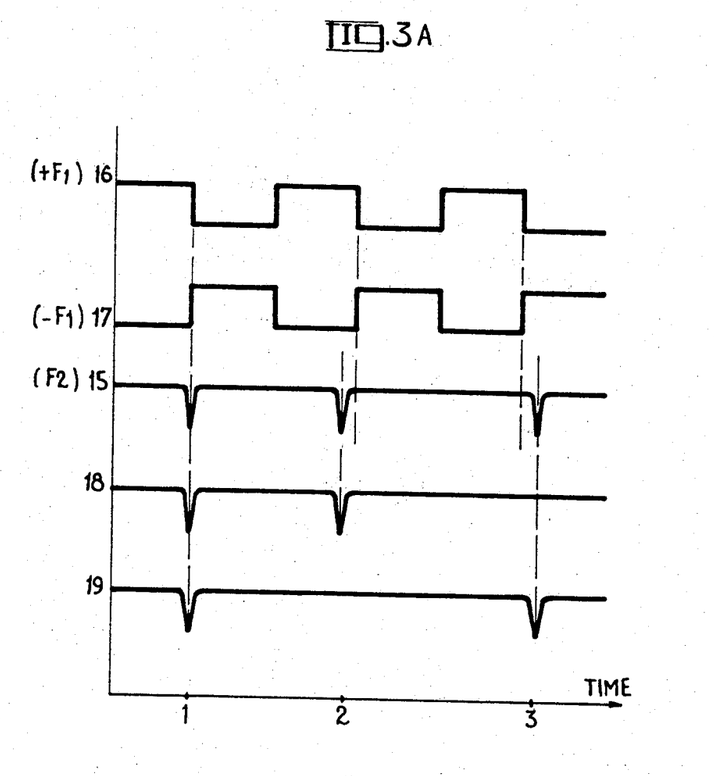
FIGS. 3A, 3B and 3C each show a set of signal waveforms occuring in a system according to the invention, respectively in the case of nonlinear control and two different forms of proportional control.
Figure 3B:
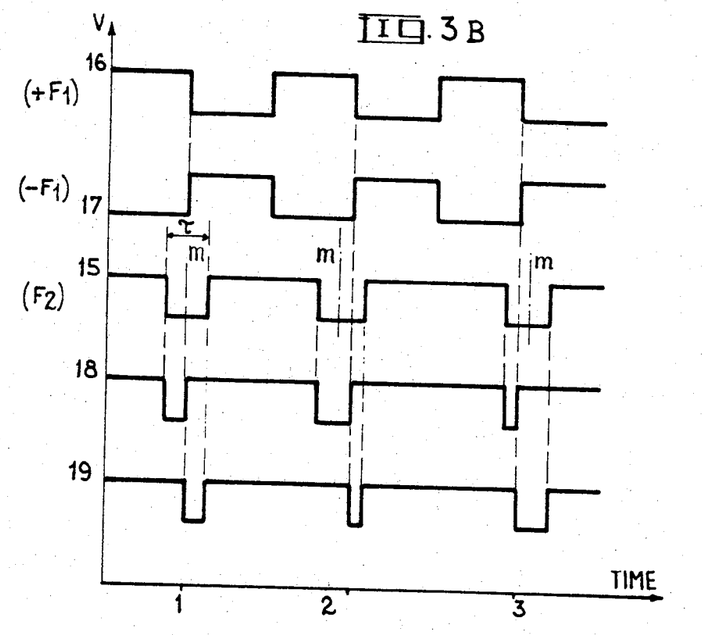

The input signal at frequency $F_2$ is passed through a conventional differentiator (and rectifier) network 3 to produce at the terminal 15 single-polarity, e.g., negative, peak pulses as shown in line "15" of FIGS. 3A and 3B. The spike pulses, whose timing corresponds with the leading edges of the rectangular input pulses, are applied to inputs of a pair of AND-gates 4 and 5 which together with integrator 6 presently referred to, constitute a phase-comparator unit generally designated 23. AND-gates 4 and 5 have further inputs connected to receive the $-F_1$ and $+F_1$ singals from terminals 17 and 16 respectively.

Referring to the time chart of FIG. 3A, it will be apparent that with the polarities indicated, a negative input peak at terminal 15 will be passed through AND-gate 4 to terminal 18, only if said negative peak occurs during a negative period of the $-F_1$ waveform, i.e., if the first ($F_1$) signal is phase-leading with respect to the second ($F_2$) signal, and will be passed through AND-gate 5 to terminal 19, only if said negative peak occurs during a negative period of the $+F_1$ waveform, i.e., if the first ($F_1$) signal is phase-lagging with respect to the second ($F_2$) signal. In FIG. 3A, the second $F_2$ peak at line "15" is shown phase-leading with respect to the $F_1$ signal, the third $F_2$ peak is shown phase-lagging with respect to the $F_1$ signal, whereas the first $F_1$ peak is in substantial synchronism with the leading edge of the $F_1$ signal.

The gated pulses at terminals 18 and 19 are applied in parallel to the input of integrator network 6, the gated pulses at terminal 19 (for example) being first inverted by passing them through an inverter network not here shown. Integrator 6 may be of any suitable form, a preferred one of which will be later described in detail. For the purpose of the summary description, it is sufficient to consider integrator 6 as leading a capacitance connected in a charging network so as to receive a charge increment of one polarity, herein negative, on application of a gated pulse from terminal 18, and to receive a charge increment of the other, here positive, polarity, on application of an inverted gated pulse from terminal 19.

The output from integrator 6 is a direct voltage which at any time corresponds in level with the total charge of the integrating capacitance previously referred to, which total charge in turn represents the time integral of all past charge increments applied. Thus, the integrator output voltage will retain a constant level so long as synchronism is present between the $F_1$ output signals and $F_2$ input signals, since at such times the positive and negative charge increments applied from terminals 18 and 19 cancel each other. Should the signal be desynchronized in either sense, with the $F_1$ signal being in phase-leading or lagging relation to the $F_2$ signal, then the integrated output voltage from integrator 6 will assume a positive or negative increment. The error output voltage from integrator 6 is applied to the frequency-controlling input 20 of oscillator 1. Hence, the oscillator output frequency $f$ retains a constant value when the input and output signals are in synchronism. In the event of a phase error between the two signals, the incremental variation in the integrator output voltage just described produces an incremental change in one or the opposite sense in the oscillator frequency, the sense depending on the sense of the phase angle.

Figure 1:
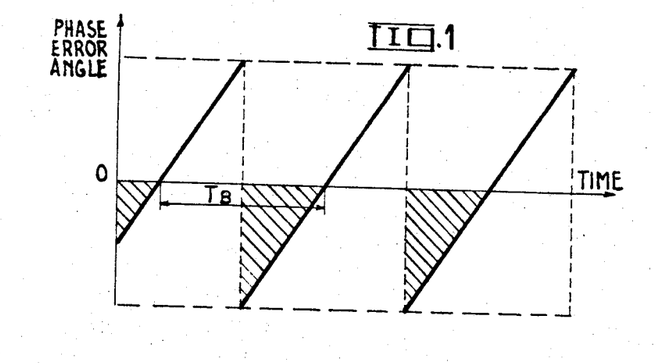
FIG. 1 is a graph illustrating the periodic phase sign reversal in a phase-lock system.

The phase-lock system as so far described is capable of highly satisfactorily maintaining phase synchronism between the input and output signals, and is further capable of achieving frequency synchronism, provided the difference in frequency between the two signals is not too great. However, should the relative frequency difference exceed a certain proportion, which may illustratively be put at about 2% of the input signal frequency, a serious difficulty is encountered. This is essentially due to the periodic sign reversal of the phase error present between the input and output signals, as will be understood from FIG. 1.

In that figure, the linear sawtooth curve shown represents the variations of the phase angle between the input and output signals with time. The phase angle varies cyclically, with a period equal to the beat period $T_B$ of the two frequencies $F_1$ and $F_2$, as will be later shown in greater detail. Since the phase angle reverses periodically in sign, it will be apparent that during those beat semicycles in which the phase angle is of one sign, say negative as shown in the hatched regions, the error signal will act to increase the phase displacement between the output and input signals rather than decreasing it as is required. In other words, the system will diverge. Unless therefore the system is able to achieve synchronism within a semicycle period of the beat frequency wherein the phase angle is of the correct sign, as in a nonhatched region of FIG. 1, the phase error will reverse before synchronism has been achieved, and such reversals will continue indefinitely; that is, the system will hunt about an erroneous frequency value of the output signal.

Figure 4:
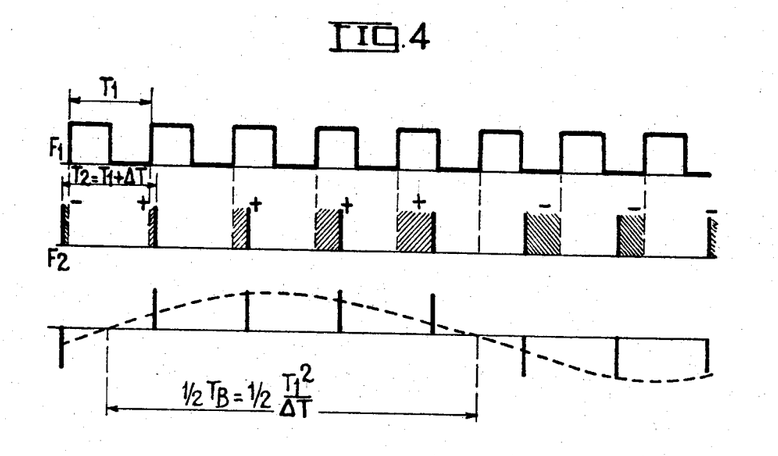
FIG. 4 is a graph showing error sign reversal in time with beat frequency, in a conventional synchronizing system.

This will be more clearly understood from FIG. 4. The uppermost line represents the squarewave output signal of frequency $F_1$ appearing at terminal 16 of frequency divider 2. The second line of the chart represents the input signal peaks at frequency $F_2$ appearing at terminal 15. The output frequency $F_1$ is assumed to be somewhat higher than the input frequency $F_2$. The phase error, represented by the time displacement between an $F_2$ spike and the nearest leading edge of an $F_1$ pulse, is seen to reverse periodically in sign. Thus, positive phase displacements are shown cross-hatched in one sense and negative displacements cross-hatched in the opposite sense. The cycle period of the reversal in sign of the phase angle is equal to the beat period and is known to be inversely proportional to the time difference between the cycle periods of the input and output signals. More precisely, if $T_1$ is the period of the output signal ($T_1=1/F_1$), and $T_2$ the period of the input signal ($T_2=1/F_2$) then the beat period $T_B$ is given by the known relation $$T_B = \frac{T_1^2}{\Delta T} \qquad (1)$$

where $\Delta T = T_2 - T_1$. Hence, the beat period and the cycle period of the phaseshift sign reversals, are longer in proportion as the output and input signal frequencies are closer to one another. In the third line of the chart, most of one full cycle $T_B$ of the beat frequency is indicated as the sinecurve in dashed lines. The error voltages applied to integrator 6 are shown as constant-amplitude peak pulses occurring in coincidence with the input pulse, the sign of said error voltage pulses being alternatively positive and negative in consecutive semicycles of the beat frequency.

The action of a synchronizing system in changing the frequency of the output signal until it equals the input signal frequency obviously cannot be instantaneous but requires time to perform, and the time required is roughly proportional in length to the initial discrepancy between the frequencies. Specifically, each incremental change in the output voltage from integrator 6 will only bring about a corresponding incremental change in the frequency of oscillator 1 and in the phasing of the $F_1$ output signal. It will therefore take a substantial number of such error voltage increments, and hence a corresponding number of $F_2$ input pulses, to alter the output signal frequency by an amount sufficient to achieve the desired synchronism.

It is apparent from the foregoing that, should the time taken by the system to bring about synchronism be longer than one half the beat period, i.e., longer than $\frac{1}{2} T_B = T_1^2/2\Delta T$, so that the sign of the error voltage reverses before the system has achieved synchronism, then the sense of variation in the oscillator output frequency likewise reverses, and such reversals will take place at every semicycle of the beat frequency, producing the hunting effect earlier referred to, with the system being incapable of ever attaining synchronism.

To avoid this frustrating situation it would be necessary to increase the absolute value of each error voltage increment, in order correspondingly to reduce the time lapse required to bring about synchronism until such time lapse has been made less than the beat frequency semicycle. This is not generaly feasible, however, because increasing the error quantum diminishes accuracy and stability of the system, especially in the presence of noise. Hence, the system as so far described is defective during the initial acquisition stage when it may be required to correct for large initial discrepancies between the signal frequencies.

Before disclosing how this defect is corrected by the invention, it is important to note that the comparator AND-gates and integrator were above assumed to operate non-linearly on a plus-and-minus, all-or-nothing basis, rather than proportionally. The voltage increments from integrator 6 are then constant quanta rather than being proportional to the phase angle to be corrected. However, in an important modification of the invention the comparator may produce proportional error voltage signals, at least within a range of phase angles not exceeding a certain limit in absolute value. Briefly to describe this modification, the input pulses at frequency $F_2$ may be applied to terminal 15 as rectangular pulses of calibrated width (as will be described with reference to FIG. 6) rather than as differentiated peaks. Referring to FIG. 3B, the input pulses are shown on line "15" as negative-going square pulses of calibrated width $\tau$, the mid-instant of a pulse being indicated at $m$. The first of the three input pulses shown has its mid-instant $m$ coinciding with corresponding leading and trailing edges of the $\pm F_1$ pulses, and in such case the gated pulses appearing at the terminals 18 and 19 are seen from the chart to be equal in width. The second input pulse is shown as having its midpoint $m$ in phase-leading relation to said corresponding edges. In this case the gated pulse at terminal 18 is broadened, and that at 19 correspondingly narrowed. The reverse conditions are true for the third input pulse shown. In such an embodiment, it will be clear that the error signal from the comparator will be substantially proportional in value to the phase error angle, provided that the phase displacement does not exceed one half the input pulse width $\tau$. However, when the phase displacement exceeds $\pm \tau/2$, it will easily be seen that one of the gated pulses at 18, 19 remains zero, and the other retains a constant maximum value regardless of further increases in phase error. In other words the error voltage increments then are quantified. The operation of the system then becomes nonlinear and entirely similar to the operation earlier described with reference to FIG. 3A.

Figure 3C:
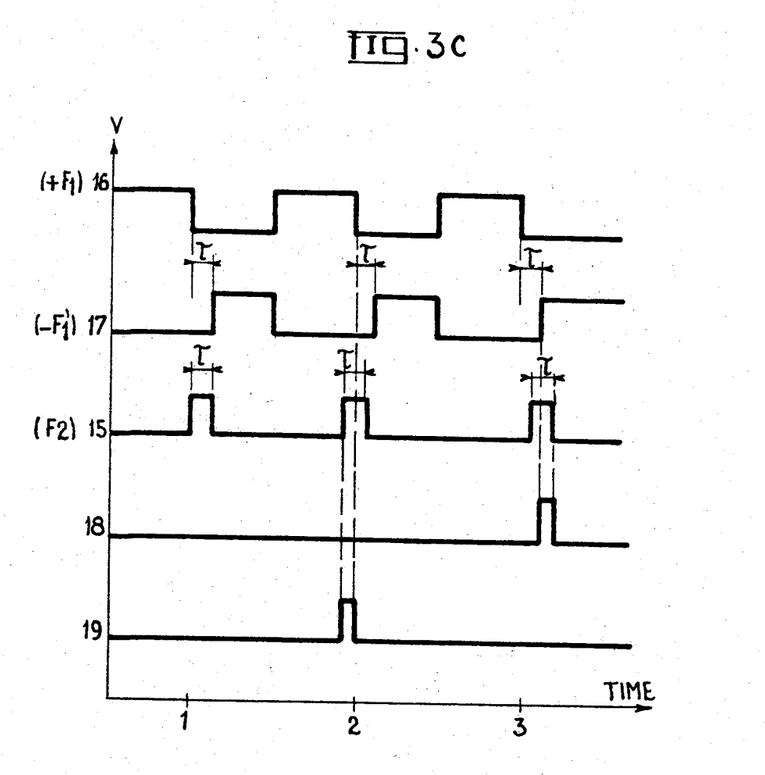

Yet another type of proportional control usable in the system of the invention is illustrated by the chart of FIG. 3C. Here, one of the two complementary rectangular output waveforms $\pm F_1$, say the waveform $-F_1$, has one of its wavefronts, as here shown the positive-going wavefront or transition, delayed by the fixed time period $\tau$. Any suitable delay logic, not shown, may be used for this purpose. The thus modified waveform is designated $(-F_1')$ in FIG. 3C. The input signals occurring at terminal 15 are rectangular pulses of the fixed, calibrated, width $\tau$, and are herein of positive polarity. With this arrangement, it will readily be understood that in the case of an in-phase input pulse ($F_2$) such as the one shown as occurring at time "1" in FIG. 3C, neither of the gates 4 and 5 will produce an output at the associated terminals 18 and 19. In the event of an input ($F_2$) pulse that occurs in leading out-of-phase relation, as shown for time "2," a pulse will appear at terminal 19, and in the event of an input pulse occurring in lagging out-of-phase relation as shown for time "3," a pulse will appear at terminal 18. Further, it will be seen that the pulses appearing at lines 18 and 19 correspond in width with the out-of-phase angle of the input pulse, so long as the relative phase shift does not exceed $\pm \tau$.

While in all of the modifications herein described, complementary rectangular waveforms are derived from the output signal at the frequency $F_1$ and time-compared with the $F_2$ input signals in pulse form, it is to be distinctly understood that the invention likewise contemplates the entirely equivalent, though reverse, arrangements wherein complementary rectangular waveforms are derived from the input ($F_2$) signals and compared with pulses derived from the output ($F_1$) signals.

Referring again to FIG. 2, means according to the invention will now be described whereby the hunting tendency, earlier described herein as liable to occur in prior systems, is completely eliminated. As shown, the differentiated input pulses at frequency $F_2$ appearing at terminal 15 are applied to the setting input of a bistable circuit 11, having its set output connected by way of a differentiator circuit 12 to one input of an AND-gate 13. The output of AND-gate 13 is connected to a resetting input 21 of the frequency-dividing counter 2 producing the output signal $F_1$. Bistable circuit 11 has its resetting input connected to the output of a binary counter 10, whose input is connected to the output of differentiator circuit 3. The circuitry just described operates as follows.

An initial input pulse appearing at input terminal 14 has its leading edge differentiated in circuit 3 and the resulting, e.g., positive peak sets the binary 11, which was previously reset as will become apparent later. The setting of binary 11 produces an, e.g., negative-going transition at the set output of the binary, which transition is differentiated in circuit 12 to produce a negative-going peak which is applied to one input of AND-gate 13. The other input of the gate is at this time energized as will appear later. The gate 13 therefore delivers an output pulse which is applied to the resetting input 21 of frequency-dividing counter 2. The counter is thereby reset to zero, and resumes its count starting with the next pulse received by it from oscillator 1. Hence the phasing of the $F_1$ output signal appearing at terminal 16 is preset on occurrence of said initial input $F_2$ pulse, so that at such initial instant the output signal has its phase set into substantial coincidence with the phase of the input signal, except for the small constant lag caused by inevitable circuit delay in the resetting action described.

Simultaneously with the setting of binary 11, the leading edge of the initial input pulse acting through differentiator 3 is applied to counter 10 to initiate a count of the input pulses. On reaching and exceeding its counting capacity, counter 10 delivers an output signal which resets binary 11. The resetting of the binary does not produce any effect; however, the binary in its reset state is now again in a condition to be set by the next incoming $F_2$ pulse, whereupon dividing counter 2 is again reset and the output signals $F_2$ are again rephased with respect to the input signals, and counter 10 again starts counting the input pulses.

The counting capacity of counter 10 is so predetermined that the counting period, is somewhat shorter than one half the value assumed by the beat period $T_B$ for the maximum discrepancy between the output and input frequencies $F_1$ and $F_2$ that is provided for in the system. The effective counting capacity of counter 10 may conveniently be made adjustable as schematically indicated by arrow 26.

Figure 5:
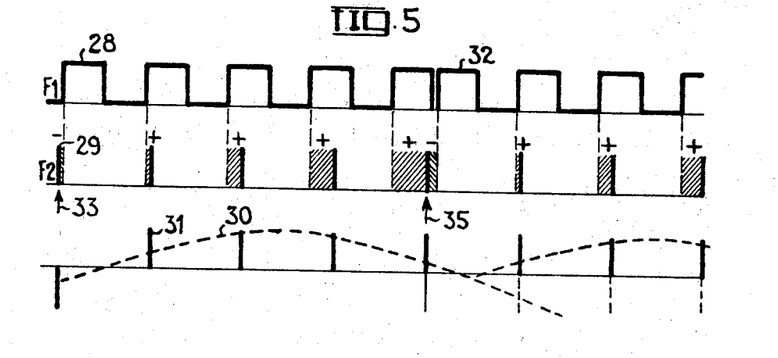
FIG. 5 is a similar graph showing how the error sign reversal is obviated through the phase-resetting feature of the invention.

The manner in which the device just described works to prevent the hunting action earlier described will best be understood by having reference to FIG. 5, where the three charts have the same general significance as the corresponding charts of FIG. 4. As shown, the leading edge 28 of the initial one of the $F_1$ output pulses is substantially synchronized with an initial one, 29, of the incoming $F_2$ pulses and it can be assumed that this initial synchronizing action is due to the "prephasing" action of the binary 11 in response to the differentiated leading edge of the first incoming $F_2$ pulse as described above and as indicated by arrow 33. Thereafter the three charts of FIG. 5 are seen to be identical with the corresponding charts of FIG. 4 within a first, positive, semicycle 30 of the beat frequency. That is, the leading edges of the output $F_1$ pulses are shown to be in phase-leading relation by ever-increasing phase angles with respect to the successive input $F_2$ pulses, owing to the assumed discrepancy between the $F_1$ and $F_2$ frequencies. Consequently, as in FIG. 4, the error voltage increments such as 31 delivered by the comparator AND-gates are all positive. However, a short time before the termination of said positive semicycle 30 of the beat frequency, the conditions are changed. The counter has ended its preset count of input $F_2$ pulses (four in the illustrated example), and has emitted a pulse through differentiator 12 and gate 13 to the resetting input of divider counter 2. The instant occurrence of this resetting or "rephasing" pulse is indicated by arrow 35. As a consequence, the output $F_1$ pulses, starting with the pulse indicated at 32, are retimed into phase coincidence with the incoming $F_2$ pulses. The phase displacement between the $F_1$ and $F_2$ pulses, instead of reversing sense as in FIG. 4, continues with the same sense as before, and the error increments in turn, instead of reversing sign and becoming negative, remain positive as shown in the bottom line chart of FIG. 5. It might be said that the rephasing action has had the effect of rectifying the beat-frequency wave. At all events, the elimination of error sign reversal suppresses the hunting operation of the system in the case of large initial frequency discrepancies between the input and output signals, while permitting the use of small error voltage increments consistent with high precision and stability of the feedback loop.

The system of FIG. 2 includes further means whereby the rephasing circuitry described above is only made operative during the initial, or acquisition, mode of system operation, and is disabled after substantial synchronism has been established between the output and input frequencies, and the subsequent phase follow-up or tracking mode of operation is instituted. For this purpose, AND-gate 13 previously mentioned has its second input connected to the output of a short-term integrater circuit 9, having its input connected to the output of an AND-gate 8. Gate 8 has one input connected to the output of differentiator 3 previously mentioned and has a second input connected to the output of a differentiator circuit 7 receiving at its input the output signal from terminal 16. The arrangement is such that the second (upper) input of AND-gate 13 is energized so long as integrator 9 produces no appreciable voltage output, and is deenergized when the integrator applies an output voltage thereto in excess of a determined level. It will be understood that for this purpose a conventional inverter circuit and a Schmitt trigger (not here shown) may be interposed in series between integrator 9 and the upper input of AND-gate 13.

With this arrangement, it will be seen that in the desynchronized condition of the system when the output and input frequencies $F_1$ and $F_2$ differ substantially from each other, as during the acquisition phase of system operation, the AND-gate 8 will sense no coincidences, or will at best only sense an occasional isolated coincidence, between the leading edges of the output and input signals as applied to the gate inputs from differentiator circuits 7 and 3. In these conditions the integrator 9 produces no output voltage or only a very low output voltage insufficient to deenergize the upper input of AND-gate 13. The said upper gate input remains continually energized, and the rephasing circuitry including binary 11 and associated elements remains operative to apply a periodic resetting pulse to dividing counter reset input 21 for periodically rephasing the output pulses with respect to the input pulses as described above. As the system approaches the synchronous condition in which the frequencies and phases of the output and input signals differ but little from one another, the leading edges of the two signal trains fall closer into step and the AND-gate 8 begins to sense longer series of consecutive coincidences between said leading edges. The resulting outputs from gate 8 are integrated in integrator 9 to produce a substantial integrated output voltage, whereupon the upper input to AND-gate 13 is deenergized, and the rephasing action is arrested. Hence, during the subsequent phase-tracking or follow-up mode of operation of the system, only the upper feedback loop including the comparator assembly 23 is operative, and the operation proceeds in the manner first described herein.

In most practical cases, the rephasing control counter 10 may be selected to have a counting capacity of 2, with satisfactory results. The resulting system is then capable of successfully handling initial frequency discrepancies as high as one octave, which is many times greater than what was permissible with conventional systems of comparable type.

The following brief analysis will however indicate how the counting capacity of counter 10 may be predetermined to achieve the desired rephasing action in an optimal way. If we designate $\delta$ the maximum permissible value of the relative frequency discrepancy that can occur during the acquisition phase of operation, then $$\delta = 1 - \frac{F_2}{F_1} \tag{2}$$

or, remembering that $F_2/F_1 = T_1/T_2$ and $T_2 = T_1 + \Delta T$, $$\delta = \frac{1}{1 + \frac{T_1}{\Delta T}} \tag{2'}$$

If N is the counting capacity of counter 10, the counting period $T_C$ of counter 10 is $$T_C = N \cdot T_2 = N(T_1 + \Delta T) \tag{3}$$

As earlier stated, the counting period $T_C$ should be slightly less than one half the cycle period of the beat frequency between the output and input signals, i.e., $$T_C = \text{(slightly less than)} \tfrac{1}{2} T_B \tag{4}$$

Combining Equations 2', 3, 4 and Equation 1 earlier written, we obtain $$N = \text{(slightly less than)}(1-\delta)^2/2\delta \tag{5}$$

or finally $$N = \frac{1}{2\delta} - 1 \text{ (approx.)} \tag{6}$$

For example, if we want the system to operate successfully with initial relative frequency discrepancies only as high as 5% (i.e., $\delta = 0.05$), then Equation 6 indicates that a suitable value for the counting capacity of counter 10 is $N=8$.

In a modification shown in FIG. 6 and later described in detail, the bistable circuit 11 and resetting counter 10 are replaced by a monostable circuit. The time constant of the monostable circuit, i.e., the time required for it to relapse into its stable or reset state after being set to its unstable state by a pulse applied to it, may be predetermined in a manner generally similar to that described above for predetermining the counting period of counter 10 in FIG. 2. This modification is especially suitable for use in cases where the input signals are provided in the form of short intermittent trains of signals at the frequency or repetition rate $F_2$, separated by relatively long silent periods, as is often the case in satellite communication systems for instance. The reset time, or time constant, of the monostable circuit may then be determined so as to ensure that the circuit is reset prior to the reception of the initial pulse in each intermittent train or burst.

It has thus been shown that the improved phaselock system of FIG. 2 including the rephasing circuitry operative during the acquisition mode of the operation of the system, is capable of reliably achieving synchronism of the output frequency with the input frequency and thereafter maintaining phase synchronism throughout the tracking or follow-up mode of operation. However, in some cases the system may require an unduly long time to attain frequency synchronism, in other words the acquisition stage may be unduly protracted. According therefore to an important aspect of the invention, means are preferably provided in the system for reducing the duration of the acquisition stage, while still retaining high degrees of accuracy and stability during the follow-up stage.

Broadly, this is accomplished by using a relatively high value of error voltage increment from the comparator assembly (designated 23 in FIG. 2) during at least a major part of acquisition stage, and automatically switching to a lower error voltage incremental value as, or preferably shortly before, the system starts to operate in the phase-follow-up mode. For example, the system may be adjusted to utilize a high error increment during an initial part of the acquisition stage, until the output frequency has been brought to within about $10^{-2}$ or 1% of its correct value; the error incrementally may then be switched to a low value and the acquisition stage continued until the output frequency and phase have been corrected to within about $10^{-3}$ (or 0.1%) of its true value. The system may then be switched to its tracking mode of operation, in which the same low error increment as in the preceding stage continues to be employed for maintaining the phase of the output signal in synchronism with that of the input signal with an accuracy of about $\pm 10^{-7}$ (one part in ten million). An embodiment of the invention using the three-stage type of operation just outlined will now be described with reference to FIG. 6.

Figure 6:
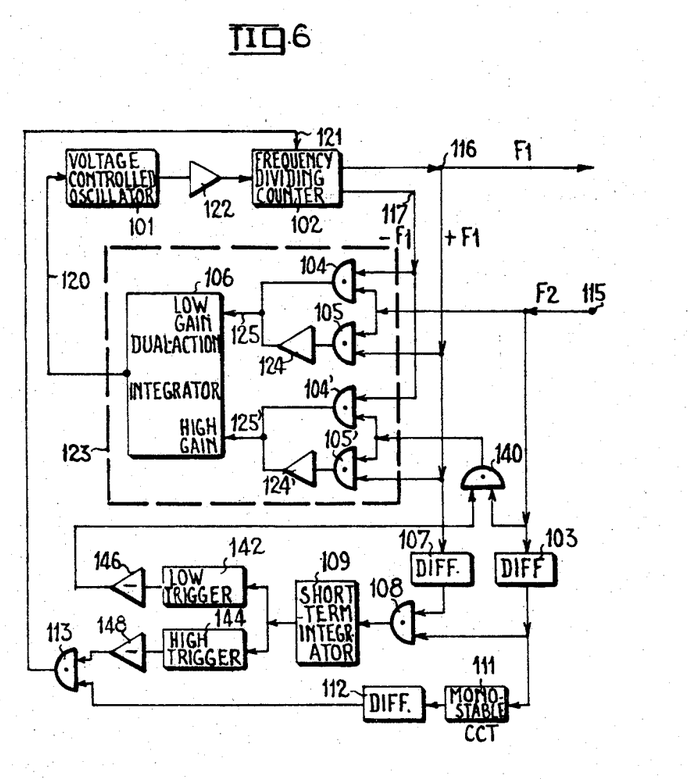
FIG. 6 is a block diagram showing another embodiment of the invention, including the dual error-increment feature.

The system shown in FIG. 6 includes a voltage-controlled oscillator 101 having its output connected, preferably through a shaper amplifier 122, to the input of a frequency-dividing counter 102. Counter 102 delivers at one, 116, of its output terminals a square-wave output voltage at the frequency $F_1$, and delivers at its other output terminal 117 a complementary square-wave output voltage at the same frequency but of reverse phase, called the output frequency $-F_1$. Input signals at the frequency $F_2$ are applied to the input terminal 115, e.g., in the form of pulses of calibrated width $\tau$ as shown on line 15 of FIG. 3B, earlier described. The output frequencies $+F_1$ and $-F_1$ from terminals 116 and 117 are applied to respective inputs of a dual-acting comparator or feedback assembly generally designated 123 and later described in detail. The input signal $F_2$ is likewise applied to comparator assembly 123, for comparison of the phases of the input and output signals. Feedback or comparator assembly 123 delivers an error voltage on line 120, which is applied to the frequency-controlling input of voltage-controlled oscillator 101.

The dual-acting feedback assembly 123 includes two pairs of comparator AND-gates 104–105 and 104'–105', and a dual-input integrator 106. The integrator has a first, or low-gain, input 125 having the outputs of the first pair of AND-gates 104 and 105 connected to it in parallel, and a second, high-gain, input 125' having the outputs of the other pair of AND-gates 104' and 105' connected in parallel to it. The outputs of gates 105 and 105' are connected to the related integrator inputs by way of inverter or complementer circuits 124 and 124'. Gates 104 and 104' have first inputs connected to receive the $-F_1$ signal from terminal 117 and gates 105 and 105' have first inputs connected to receive the $+F_1$ signal from terminal 116. Gates 104 and 104' have second inputs connected to receive the $F_2$ signal from input terminal 115. Gates 105 and 105' have second inputs connected in parallel to receive the output of an AND-gate 140 having a first input connected to receive the $F_2$ signal from terminal 115.

The $+F_1$ signal from terminal 116 and the $F_2$ signal from input terminal 115 are passed through respective differentiator networks 107 and 103. Network 103 has its output connected to the input of a monostable circuit 111 whose output is connected through a differentiator network 112 to one input of an AND-gate 113. Differentiators 107 and 103 further have their outputs connected to inputs of an AND-gate 108 whose output is connected to the input of a short-term integrator 109. The integrator output is connected in parallel to the inputs of two Schmitt trigger circuits 142 and 144, circuit 142 having a lower trigger threshold level than has circuit 144. Schmitt trigger circuit 142 has its output connected by way of an inverter network 146 to the second input of AND-gate 140, while trigger circuit 144 has its output connected by way of an inverter network 148 to the other input of AND-gate 113. Gate 113 has its output connected to the reset input 121 of dividing counter 102.

The operation of the system of FIG. 6 will be more readily understood when it is noted that parts thereof having counterparts in FIG. 2 are designated by the same numerals plus one hundred. It should further be noted that in the operation of the two-input integrator 106 of FIG. 6, one embodiment of which will later be described in detail, a voltage pulse of given magnitude applied to the low-gain input 125 causes the output 120 of the integrator to emit an error voltage increment of one value, while a voltage pulse of the same magnitude applied to high-gain 125' causes the integrator output 120 to emit an error voltage increment of substantially larger value.

With the above in mind, the operation of the FIG. 6 system can be summarized as follows. At the start of an operating cycle when the output frequency $F_1$ differs substantially from the input frequency $F_2$ (as by a relative frequency differential of 10% or more), AND-gate 108 will sense no more than an occasional, isolated, coincidence between differentiated leading edges of the $F_1$ and $F_2$ signals as applied to it from differentiator networks 107 and 103. Hence, the short-term integrator 109 produces no output voltage. The Schmitt triggers 142 and 144 are therefore not actuated. The no-voltage condition at the output of high trigger 144 is converted to a voltage output in inverter network 148 which energizes the upper input of AND-gate 113. In this condition therefore gate 113 will operate to pass reset pulses to the resetting input 121 of counter 102 at regular intervals determined by the time constant of monostable circuit 111 thereby providing the periodic rephasing action earlier described. It will be understood that the monostable circuit 111 in FIG. 7 may if desired be replaced by a combination comprising a bistable circuit 11 and resetting counter 10 as shown in FIG. 2.

Furthermore, at this time the no-voltage condition at the output of low Schmitt trigger 142 is converted to a voltage output in inverter network 146 which energizes the lower input of AND-gate 140. The $F_2$ input pulses are therefore passed by this gate to both AND-gates 104' and 105' for phase comparison thereof with the $\pm F_1$ output pulses, and the resulting phase error voltage pulses are applied to the high-gain input 125' of integrator 106. In response to every phase error pulse, the error voltage at integrator output 120 is changed by a large incremental amount in one or the other sense. As a result the frequency of voltage-controlled oscillator 101 is altered at a relatively rapid rate and the frequency of the output pulses $\pm F_1$ is adjusted at a correspondingly fast rate into approximate synchronism with the input frequency $F_2$.

After this rapid adjustment has proceeded sufficiently to bring the output frequency $F_1$ to a value differing by less than, say 1% from the input frequency $F_2$, AND-gate 108 begins sensing repeated coincidences between the leading edges of the output and input pulses, and short-term integrator 109 begins to produce a corresponding output voltage, triggering the low-threshold Schmitt circuit 142. The circuit 142 now produces an output voltage, which is converted by inverter 146 into a no-voltage condition, deenergizing AND-gate 140. The pair of AND-gates 104'–105' are therefore disabled, and the phase-comparison action between output and input signals is now effected only by the pair of AND-gates 104–105, so that the phase error pulses are applied only to the low-gain input 125 of integrator 106. Integrator output line 120 now delivers error voltage changes of low incremental value, effecting fine frequency adjustment of the oscillator 101 until the output signal frequency $F_1$ has been synchronized with the input frequency $F_2$ to within less than, say one per mil ($10^{-3}$) of the input frequency value.

At this time AND-gate 108 senses long series of repeated coincidences between the leading edges of output and input pulses, and short-term integrator 109 delivers a correspondingly high voltage output, which is now sufficient to trigger the higher-threshold Schmitt circuit 144. The voltage output from circuit 144, inverted to a no-voltage output in complementer network 148, deenergizes AND-gate 113, arresting the rephasing action. The system has thus been switched from the acquisition operating mode to the phase-follow-up mode, in which it functions to maintain precise frequency and phase synchronism between the output $F_1$ pulses and input $F_2$ pulses, to within $10^{-6}$ or better accuracy.

Figure 7:
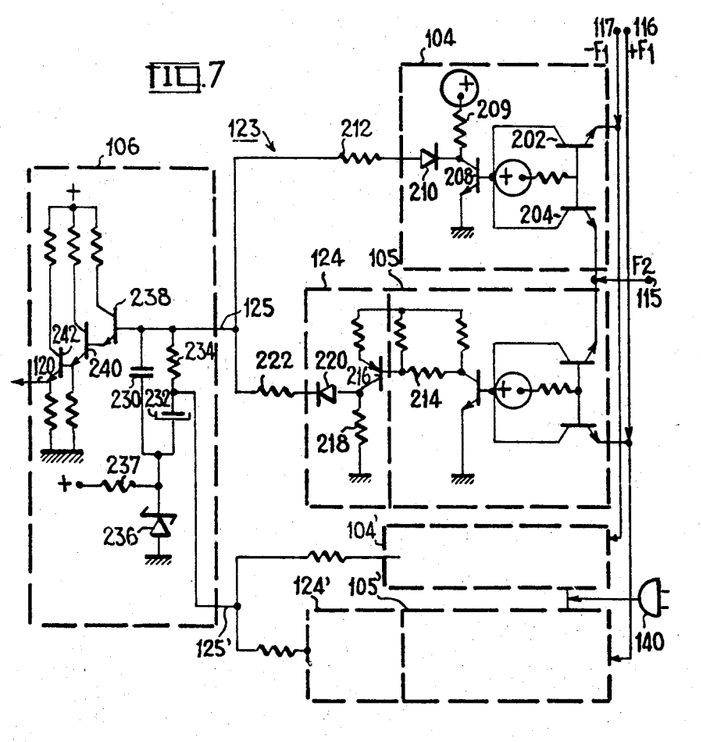
FIG. 7 shows a dual-acting comparator and integrator usable with the system of FIG. 6.

An exemplary embodiment of the dual-acting feedback or comparator assembly 123 will now be described with reference to FIG. 7. The AND-gate 104 comprises two NPN transistors 202 and 204 connected base to base and positively base-biassed through a resistor. The emitters of transistors 202 and 204 are respectively connected to receive the $-F_1$ and $F_2$ frequencies as earlier described. The collectors of both transistors are connected in common to the base of a transistor 208 having its emitter grounded and its collector positively biassed through a resistor 209, and connected through a negatively-poled rectifier diode 210 and a series load resistor 212 to the low-gain input 125 of integrator 106.

In the operation of this gate, transistors 202 and 204 are normally biassed for conduction and transistor 208 is normally biassed to cut-off. On simultaneous occurrence of positive transitions in the $-F_1$ and $F_2$ signals applied to the emitters of transistors 202 and 204, the combined resulting voltage passed by both transistors to the base of transistor 208 is sufficient to render the latter conductive, whereupon the positive voltage on resistor 209 leaks off through transistor 208 to ground, producing a negative pulse that is passed through diode 210 and resistor 212 to the integrator input 125.

AND-gate 105 is similarly constructed but its normally cut-off output transistor (corresponding to 208) has its collector connected through a resistor 214 to the base of a PNP transistor 216 constituting the inverter network 124. Transistor 216 has its emitter biassed positively, and has its collector grounded through a resistor 218 and connected through the positively-poled diode 220 and input load resistor 222 to the integrator input 125. Transistor 216 is normally biassed to cut-off. On simultaneous occurrence of positive transitions in the $+F_1$ and $F_2$ signals applied to the emitters of the input transistors of gate 105, a negative pulse appears at the collector of the output transistor of said gate, as was described for gate 104. This negative pulse is applied to the base of inverter transistor 216, rendering the latter conductive (since its collector is normally negative relative to its emitter). A positive voltage pulse is therefore passed through transistor 216 and appears at the collector resistor 218, whence it is passed through positively-poled diode 220 and load resistor 222 to the integrator input 125.

Gates 104' and 105' and inverter stage 124' are respectively similar to gates 104 and 105 and inverter 124 just described and are therefore not shown in detail.

Integrator 106 comprises two parallel capacitive legs, the one comprising a capacitor 230 of relatively small capacitance, and the other comprising a capacitor 232 of much larger capacitance connected in series with a resistor 234. The junction of capacitor 230 and resistor 234 is connected to the low-gain integrator input terminal 125, the junction of capacitor 232 and resistor 234 is connected to the high-gain input terminal 125', and the junction of the capacitors 230 and 232 is grounded, preferably through a Zener diode 236 having its cathode positively biassed through resistor 237. The integrator further includes a three-stage transistor D-C output amplifier comprising the cascaded NPN transistors 238, 240, 242 having their collectors positively biassed, and the emitters of transistors 240 and 242 being grounded through load resistors. The base of the first-stage transistor 238 (so-called Darlington stage) is connected to integrator input junction 125 and the emitter of the third-stage transistor 242 constituting an emitter-follower stage, is connected to integrator output line 120. Zener diode 236 serves to provide non-linear compensation for the output amplifier stage threshold.

In the operation of this integrator network, it can be shown from a discussion of the transfer function of the network that when charging pulses are applied directly to the junction of resistor 234 and large capacitor 232 from the high-gain input 125', as is the case during the the acquisition phase of the system, the output line 120 delivers integrated pulse increments of relatively large, and substantially constant, magnitude. When on the other hand the input pulses are applied by way of the low-gain input 125, as during the phase follow-up operating mode, the increment pulses delivered by line 120 are substantially smaller; said pulses are then, moreover, approximately proportional to the phase error between the input and output signals as represented by the width of the variable pulses delivered by the AND-gates 104 and 105, as described with reference to FIG. 3B.

The integrator network just described may advantageously also be used as the single-input integrator 6 in the system of FIG. 2, it being simply necessary for that purpose to omit the high-gain input 125' and associated gate circuits 104'–105'.

It will be understood that while the integrator just described is used in preferred embodiments of the invention, other types of integrating devices are also usable, including conventional RC integrating networks, transfluxor integrating devices, and the like.

Phaselock systems according to the described embodiments of the invention have been operated to synchronize input signals in the form of intermittent pulse trains or bursts occupying only 5% of the total transmission time. The initial frequency discrepancy could attain relative values of 10% to 12% and as high as one octave, while still permitting reliable synchronization. The acquisition period required for completion about 1000 input pulses in the intermittent type of operation just referred to, and as little as fifty pulses in cases where the input pulses were continuous rather than intermittent. After initial frequency synchronization had been attained, at the end of the acquisition stage, phase synchronism was maintained in a stable manner to within $\pm 10^{-7}$ in the subsequent phase followup stage. These results were reliably obtained even in the presence of relatively low input signal to noise ratios.

As will be apparent, a wide variety of modifications may be introduced into the embodiments described and shown without departing from the invention. For example, instead of effecting the rephasing action at fixed intervals as determined by the capacity of counter 10 (FIG. 2) or the time constant of monostable circuit 111 (FIG. 6), the interval between rephasing actions may be varied so that the length of the intervals is increased as the system is brought closer to synchronism. This may be done, for instance, by connecting the output of short-term integrator 9 through suitable Schmitt trigger circuitry to a selector diode network connected with counter 10 (FIG. 2) for altering the effective capacity of the counter.

Various other changes and improvements may be made in the logical circuitry illustrated. Thus, the input signals appearing at terminal 14 (or 114) may be passed through a bistable circuit if desired to impart a rectangular waveform to them. Further, the input $\pm F_1$ output signals may be passed through a differentiating network prior to application to the comparator. The means used for comparing the phase conditions of the output and input signals and supplying phase error-indicating pulses to the integrator, may differ from the AND-gates shown.

The means for producing error signals of different relative magnitude depending on the value of the frequency and phase discrepancy present between the output and input signals, may differ from the means here shown. As one possible modification, instead of providing the two pairs of coincidence gates (104–105 and 104'–105') shown in FIGS. 6 and 7, only a single pair of gates may be used having their outputs selectively switched between the high-gain and low-gain inputs of the integrator. As another modification, said means may be so designed as to alter the duration of the pulses applied from the coincidence gates to the integrator, as will be readily understood by those familiar with the art, and in such case the pulses may be applied to a common input of the integrator device rather than being applied to a high-gain and a low-gain input thereof as shown.

What I claim is:
1. A system for synchronizing a periodic signal in frequency and phase comprising:
  means defining a train of periodic phase reference time points at the nominal frequency of said signal;
  means producing an error signal indicative of a time discrepancy between a determined time point within each cycle period of said periodic signal and a corresponding one of said reference time points;
  means controlled by the error signal to vary the frequency of said periodic signal in a sense to reduce said time discrepancy;
  means for altering the phase condition of said periodic signal to shift said signal time points into substantial coincidence with said reference time points; and means operating the phase-altering means at intermittent times throughout the operation of said frequency-varying means whereby intermittently to reset the phase condition of said periodic signal into substantial agreement with said phase reference.

2. The system defined in claim 1, including means for generating said periodic signal comprising:

a variable-frequency oscillator and a dividing counter connected to receive the output of the oscillator and delivering said periodic signal;

said oscillator having a frequency-controlling input constituting said means for varying the frequency of the periodic signal; and said counter having a resetting input constituting said means for altering the phase condition of the periodic signal.

3. The system defined in claim 1, wherein said means intermittently operating the phase-altering means comprises a two-state element settable to one state by one of said phase reference time points for emitting a reset command signal and resettable to its other state after occurrence of a number of said phase reference time points, said element having an output connected for operating said phase-altering means.

4. A system for synchronizing first and second periodic signals of common nominal frequency, comprising;

means producing an error signal indicative of a discrepancy between the phase conditions of the signals, comprising:

coincident means responsive to predetermined time points in each cycle period of respective periodic signals and delivering pulses at substantially said common nominal frequency corresponding in sign to the sense of the time discrepancy between said time points, and integrator means having an input receiving said pulses from the coincidence means and delivering an integrated error signal;

means connected for control by said error signal to vary the frequency of said first signal in a sense to reduce said discrepancy;

means for altering the relative phase condition between said first signal and said second signal independently of said means varying the frequency of said first signal to bring about substantial coincidence between said respective time points; and means operating said phase-altering means intermittently throughout the operation of said frequency-varying means whereby to reset the relative phase condition of said signals into substantial agreement.

5. A system for synchronizing a periodic signal in frequency and phase, comprising:

means defining a phase reference for said signal;

means producing an error signal indicative of a phase discrepancy of said signal with respect to said reference comprising:

first means producing a relatively large error signal, second means producing a relatively small error signal, and selector logic switchable to a first condition for enabling said first error signal producing means and switchable to a second condition for enabling said second error signal producing means;

means controlled by the error signal to vary the frequency of said periodic signal in a sense to reduce said discrepancy;

means for altering the phase condition of said periodic signal with respect to said reference independently of said means varying the frequency thereof;

means intermittently operating the phase-altering means to reset the phase condition of said signal into substantial agreement with the phase condition of said reference;

means sensing the amount of said discrepancy;

means connecting the discrepancy-sensing means to said selector logic for switching the latter from its first to its second condition when the sensed discrepancy is less than a prescribed amount; and means connecting the discrepancy-sensing means to said resetting means for disabling the latter when the sensed discrepancy is less than a predetermined amount.

6. The system defined in claim 5, wherein said prescribed amount of discrepancy for which the logic is switched is somewhat greater than said predetermined amount of discrepancy for which the resetting means is disabled.

7. The system defined in claim 5, wherein said discrepancy-sensing means comprises:

coincidence means having inputs connected to receive pulses indicative of corresponding time points of said periodic signal and said phase reference, and having an output producing pulses indicative of substantial coincidence between said time points;

an integrator receiving said coincidence pulses from the output of the coincidence means and producing an integrated output indicative of the amount of frequency and phase discrepancy between said periodic signal and said phase reference; and trigger means having inputs connected to the output of said integrator and having respective outputs connected to said selector logic and said resetting means.

8. A system for synchronizing a periodic signal in frequency and phase, comprising:

means defining a phase reference for said signal;

means producing an error signal indicative of a phase discrepancy of said periodic signal with respect to said reference;

means controlled by the error signal to vary the frequency of said periodic signal in a sense to reduce said phase discrepancy;

means for altering the phase condition of said periodic signal with respect to said reference independently of said means varying the frequency thereof;

means intermittently operating the phase-altering means to reset the phase condition of said periodic signal into substantial agreement with the phase condition of said reference;

means sensing the amount of the frequency and phase discrepancy between said periodic signal and said phase reference; and means connecting the output of the discrepancy-sensing means for disabling said phase-resetting means when the sensed discrepancy is less than a prescribed value.

9. A system for synchronizing a periodic signal in frequency and phase, comprising:

means defining a phase reference for said signal;

means producing an error signal indicative of a phase discrepancy of said periodic signal with respect to said reference;

means controlled by the error signal to vary the frequency of said periodic signal in a sense to reduce said phase discrepancy;

means for altering the phase condition of said periodic signal with respect to said reference independently of said means varying the frequency thereof;

a bistable device connected to be set to one state by said phase reference; and a digital counter having an input connected to receive said phase reference and having an output connected for resetting said device to its other state after said counter has counted a determined number of said phase references;

said device having an output emitting a reset command signal in said one state of the device and connected for operating said phase-altering means whereby intermittently to reset the phase condition of said periodic signal into substantial agreement with the phase condition of said reference.

10. A system for syncronizing a periodic signal in frequency and phase, comprising:

means defining a phase reference for said signal;

means producing an error signal indicative of a phase discrepancy of said periodic signal with respect to said reference;

means controlled by the error signal to vary the frequency of said periodic signal in a sense to reduce said phase discrepancy;

means for altering the phase condition of said periodic signal with respect to said reference independently of said means varying the frequency thereof;

a two-state element connected to be set to one state by said phase reference for thereupon emitting a reset command signal, and reset to its other state after occurrence of a number of said phase references, including means for applying said reset command signal for operating the phase-altering means whereby intermittently to reset the phase condition of said periodic signal into substantial agreement with the phase condition of said reference;

integrator means connected to sense a frequency discrepancy between said periodic signal and said phase reference and producing an integrated signal corresponding to the amount of the discrepancy;

coincidence means having an input connected to receive said reset command signal from the two-state element and another input connected to receive said integrated signal, said coincidence means having an output, and said reset command signal being effectively transferred to said output only in the presence of an integrated signal corresponding to a discrepancy less than a prescribed amount;

said coincidence means output being connected to said resetting means whereby the reset command signal will effectively reset the phase condition of said periodic signal only in the presence of a frequency discrepancy less than said prescribed amount.

11. A system for synchronizing first and second periodic signals, at least one of said signals being a rectangular waveform signal, comprising:

means producing an error signal indicative of a discrepancy between the phase conditions of the signals, comprising:

means connected for deriving from said at least one rectangular waveform signal a further rectangular waveform signal generally complementary thereto;

a pair of coincidence gates each having a first input respectively receiving said at least one rectangular waveform signal and said complementary rectangular waveform signal and each having a second input receiving the other of said periodic signals;

means complementing the output of one of said gates;

integrator means having an input connected to receive the complemented output of said one gate and the output of the other gate and delivering an integrated error signal;

means connected for control by said error signal to vary the frequency of said first signal in a sense to reduce said discrepancy;

means for altering the relative phase condition between said first signal and said second signal independently of said means varying the frequency of said first signal; and menas intermittently operating said phase-altering means to reset the relative phase condition of said signals into substantial agreement.

12. The system defined in claim 11, including means generating said first periodic signal comprising:

a variable-frequency oscillator; and a dividing counter connected to receive the oscillator output and delivering said first periodic signal;

said oscillator having a frequency-controlling input constituting said means for varying the frequency of the first periodic signal;

said counter having a resetting input constituting said means for altering the phase condition of said first periodic signal;

said dividing counter having two complementary outputs for respectively delivering said one rectangular periodic signal and said derived other rectangular signal.

13. A system for synchronizing first and second periodic signals, comprising:

means producing an error signal indicative of a discrepancy between the phase conditions of the signals, comprising:

coincidence means responsive to predetermined time points in the waveforms of said periodic signals and delivering pulses corresponding in sign to the sense of the time discrepancy between said time points;

integrator means connected for receiving said pulses from the coincidence means and delivering an integrated error signal, said integrator means comprising an RC network having a pair of capacitive circuit branches in parallel, one branch containing a relatively low capacitance and the other branch containing a relatively high capacitance and resistance in series;

means connected for control by said error signal to vary the frequency of said first signal in a sense to reduce said discrepancy;

means for altering the relative phase condition between said first signal and said second signal independently of said means varying the frequency of said first signal;

means intermittently operating said phase-altering means to reset the relative phase condition of said signals into substantial agreement;

logic switchable to one condition for applying said pulses from the coincidence means to the junction of said resistance and high capacitance and switchable to another condition for applying said pulses to said low capacitance;

means connected to sense the amount of a frequency and phase discrepancy between said periodic signals; and means connecting the discrepancy-sensing means for switching said logic to said one condition when the sensed discrepancy is greater than a prescribed value and to said other condition when the sensed discrepancy is less than said prescribed value.

References Cited

UNITED STATES PATENTS 3,259,851 7/1966 Brauer _______________ 331—14

FOREIGN PATENTS 1,024,427 3/1966 Great Britain.

ROY LAKE, *Primary Examiner.*

S. H. GRIMM, *Assistant Examiner.*